Oct. 8, 1957 P. VARGO ET AL 2,808,636
APPARATUS FOR MAKING SOLDER TERMINALS
Filed Nov. 19, 1953 4 Sheets-Sheet 1
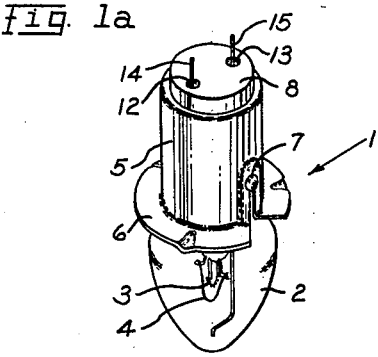
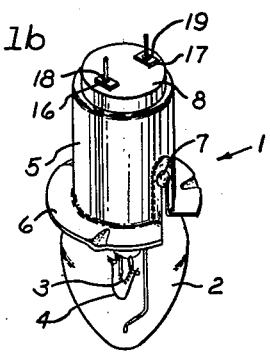
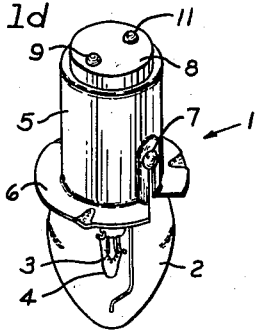
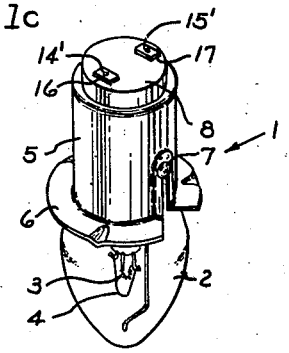
Inventors:
Paul Vargo,
Thomas A. Foster Jr.,
by Vernet C. Kauffman
Their Attorney

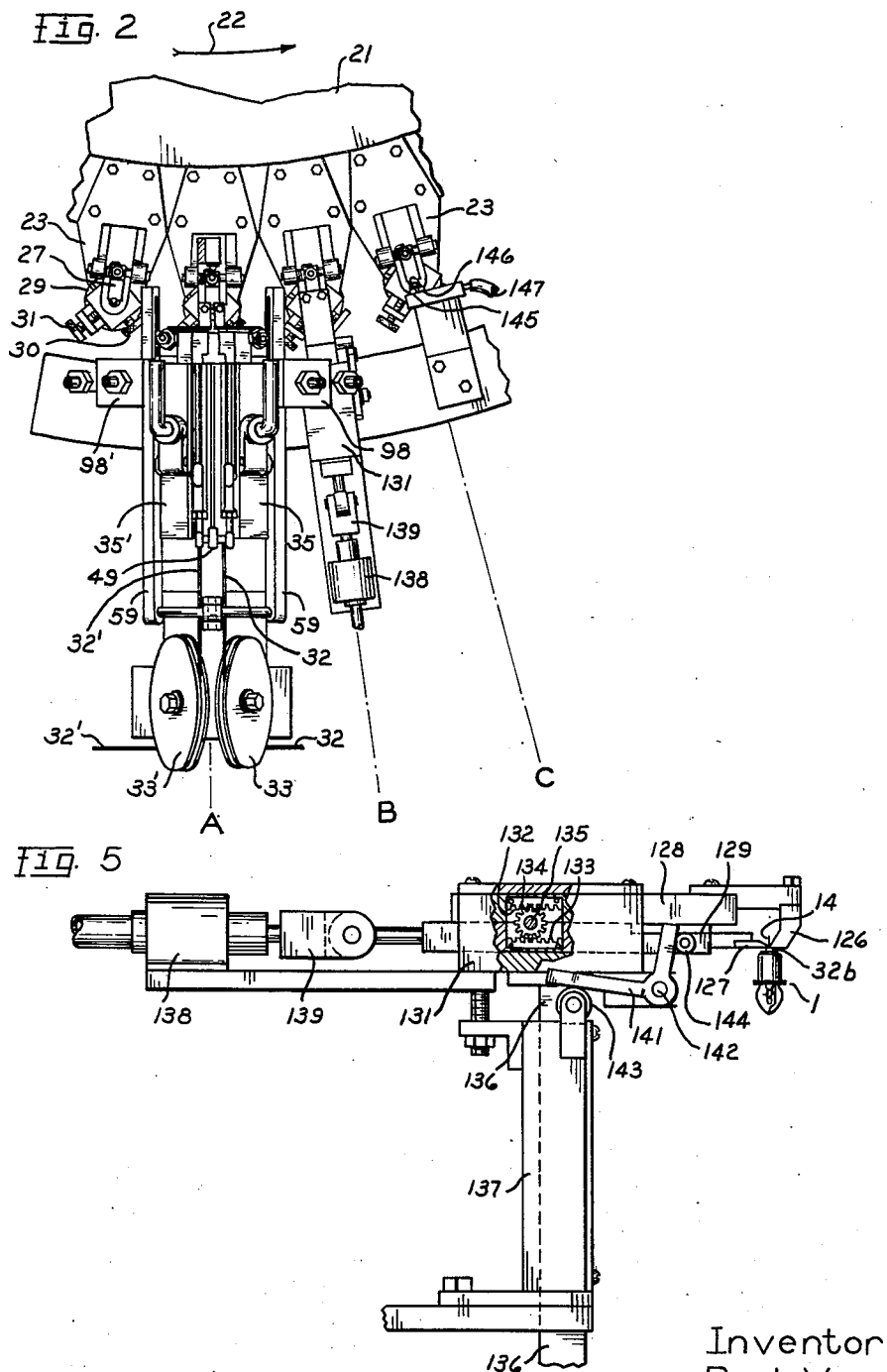

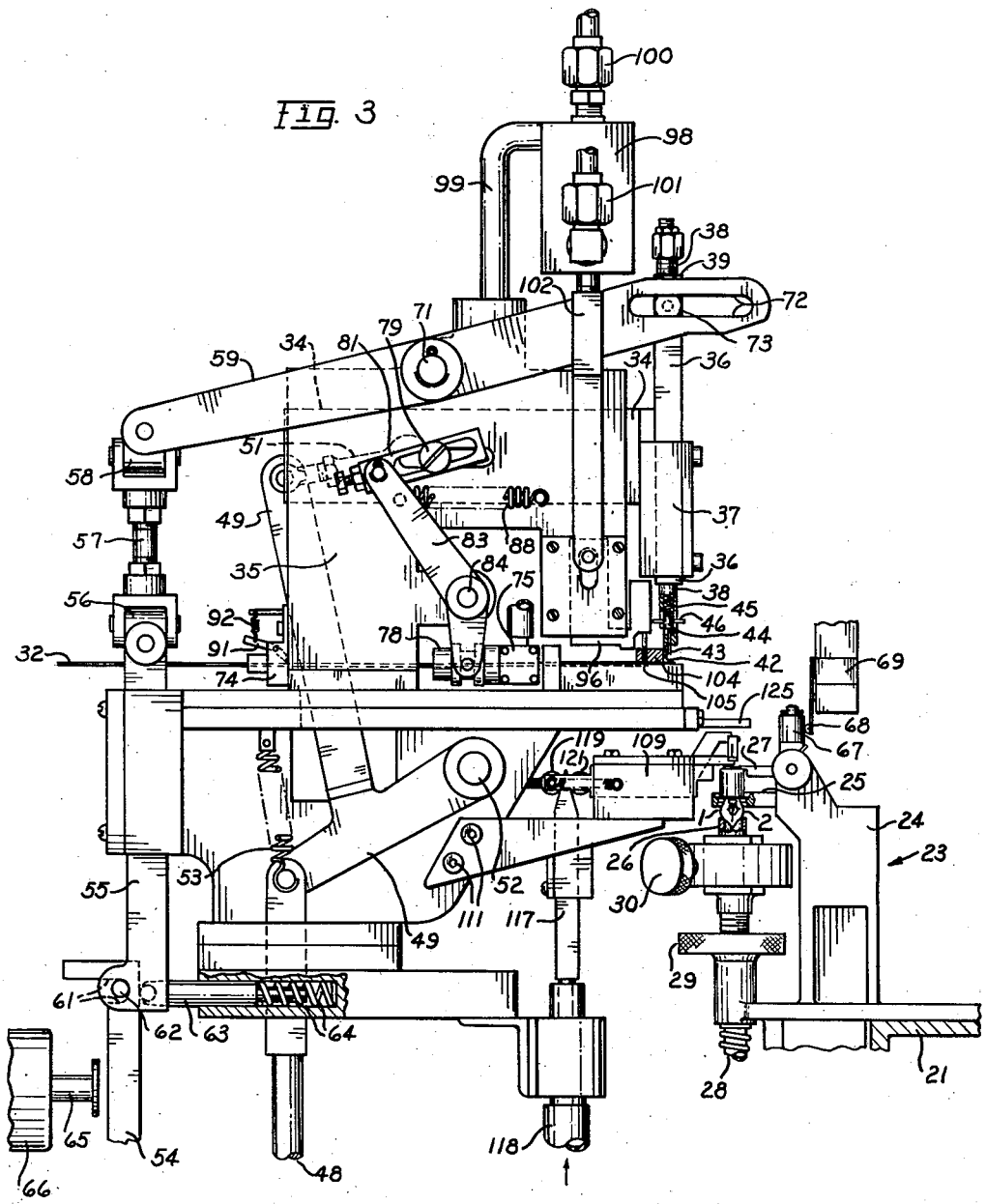

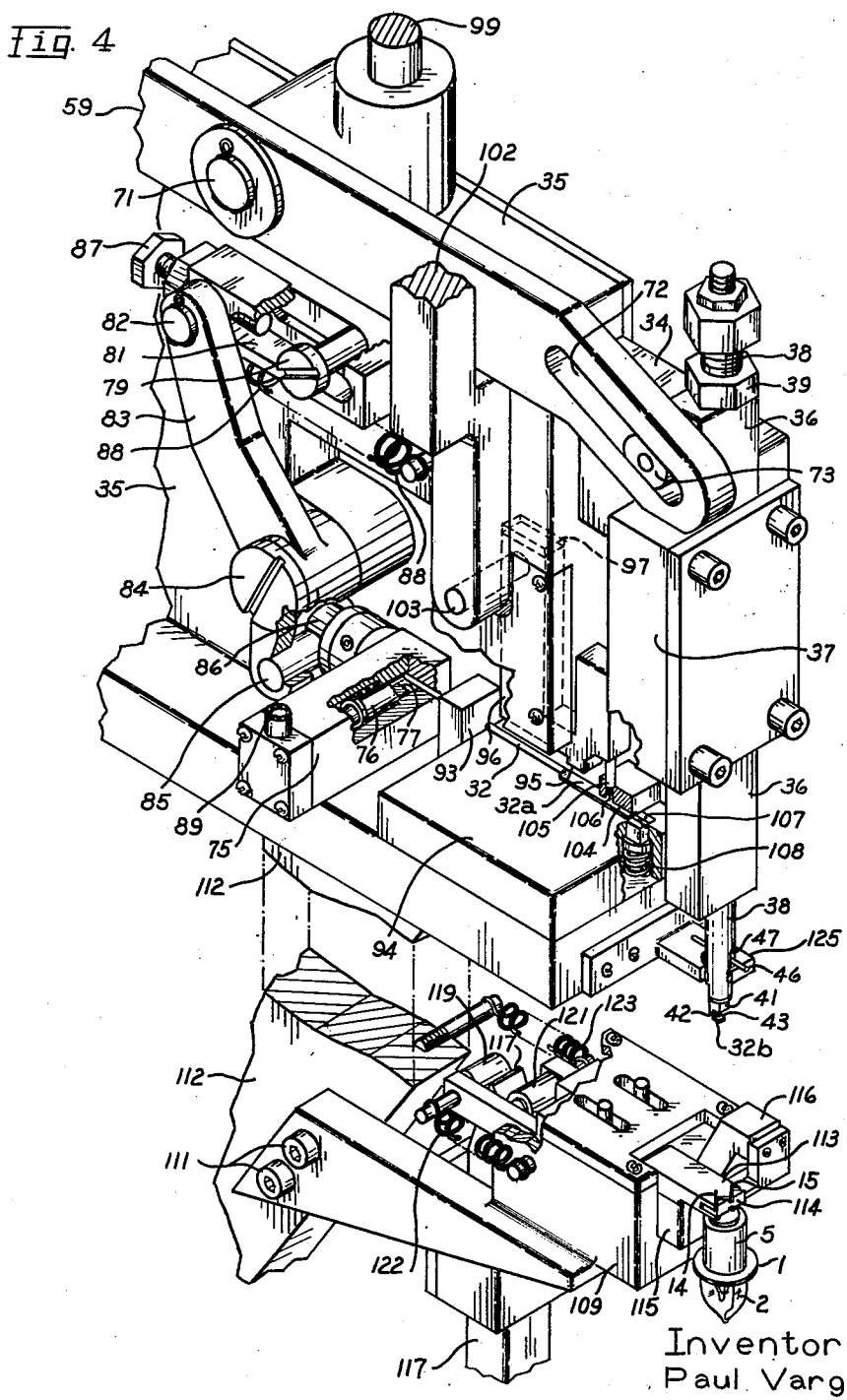

United States Patent Office 2,808,636
Patented Oct. 8, 1957

2,808,636

APPARATUS FOR MAKING SOLDER TERMINALS

Paul Vargo, Lyndhurst, and Thomas A. Foster, Jr., East Cleveland, Ohio, assignors to General Electric Company, a corporation of New York Application November 19, 1953, Serial No. 393,125

5 Claims. (Cl. 29—25.2)

This invention is in the field of electric lamp manufacturing and relates to the basing operation. As generally practiced, this operation involves threading the lead wires of the bulb through the terminal apertures of the base, cementing or otherwise fastening the base to the bulb, trimming off the lead wires, and soldering or otherwise permanently connecting the lead wires to the contacts of the base.

One lead-in wire is soldered to the rim of the base and the other to the end cotnact. The end contact is usually a brass eyelet partly imbedded in a web of insulating material, such as glass or a thermo-setting plastic, which closes the end of the base. With lamps having two filaments intended for separate control, a pair of spaced eyelets are provided in the web. However, with certain very small sizes of incandescent lamps, it becomes impractical to provide two eyelets in the web of the base. One solution to this problem consists in fusing a small bead of solder to the end of each lead wire within tiny cavities or wells in the web of the base. An example of a lamp so constructed is the miniature, prefocued two-filament bulb for flashlights which is presently coming into general use. It has been found that the processes and soldering mechanisms which have been generally used heretofore are not suitable for making solder terminals of this type.

Accordingly, an object of our invention is to provide a new and improved process for making solder terminals wherein the solder itself serves as the contact.

Another object is to provide a process for making solder terminals which is readily adaptable to mechanization in conjunction with electric lamp manufacture.

A further object is to provide an apparatus for effectively carrying out the method of the invention.

A more specific object is to provide a solder feeding mechanism operable with an electric lamp basing machine to form flat perforated solder slugs from continuous solder stock, and to deposit such slugs on the lamp bases with the lead wires threaded through the holes in them.

The method of our invention, as applied to the making of an electric lamp base having solder contacts consisting of small beads of solder attached to the ends of the lead wires and reposing in tiny wells in the web of the base, involves the following steps. A perforated slug of solder is first seated on the insulating web of the base with the lead wire threaded through the perforation. The solder slug is of such size that, when fused into a generally spherical bead, the lower half of the bead substantially fills the well in the insulating web and the upper half protrudes above the surface of the web. In the next step, the excess length of lead wire projecting beyond the solder slug is trimmed off. Finally the solder slug is heated to its melting point whereby to draw it into a bead which wets the end of the lead wire and remains attached to it upon cooling. The surface tension of the solder in its molten state is sufficient to cause the slug to draw into a bead of generally spherical shape evenly disposed about the end of the wire.

The preferred apparatus embodying our invention and particularly useful in carrying out the above-described method, comprises a solder slug feeding mechanism. This mechanism receives the solder as round wire, flattens it to a fairly thick ribbon and perforates the ribbon at even intervals, the intervals corresponding to the intended size of the slugs. The mechanism also includes a shearing and transfer device which cuts off the slugs from the ribbon, picks them up and releases them over the lead wires of the lamps.

For further objects and advantages and for a better understanding of the invention, attention is now directed to the following description and accompanying drawings. The features of the invention believed to be novel will be more particularly pointed out in the appended claims.

In the drawings,

Figs. 1a to 1d illustrate pictorially the sequence of steps of our method as applied to the making of solder contacts on a miniature incandescent lamp, Fig. 1d showing the finished lamp.

Fig. 2 is a plan view of a fragment of an electric lamp basing machine equipped with a solder feeding mechanism embodying our invention.

Fig. 3 is a side elevation of the solder feeding mechanism.

Fig. 4 is a pictorial view showing the essential operative elements of the solder feeding mechanism.

Fig. 5 is a side elevation of the lead wire trimming apparatus.

The invention will be described by reference to a miniature two-filament, prefocused incandescent lamp for flashlights. The finished lamp is illustrated in Fig. 1d, wherein it is shown approximately twice full size. The lamp 1 comprises a bulb 2 enclosing a pair of filaments 3 and 4 mounted on lead wires butt-sealed through the bulb. The base comprises a metal shell 5 provided with a flange 6 which assists in accurately locating the base within its socket in order to position the filaments at the focal point of a reflector. The base is cemented to the neck of the bulb, and one lead wire from each of the filaments 3 and 4 is soldered to the base shell in the lateral slot at 7. The outer end of the base shell is closed by a web 8 of an insulating material which in the present instance consists of a thermo-setting plastic. The remaining lead wires are terminated at the surface of web 8 in solder beads 9, 11. These beads are generally spherical in form and their lower halves repose in hemispherical wells 12, 13 (shown in Fig. 1a) in the surface of the web, whereas their upper halves protrude above the web. It has been found that this arrangement provides firm anchoring of the solder beads and eliminates the need for the brass eyelets generally used for contacts. In the ordinary use of the bulb, the flashlight is provided with a socket having contacts making separate connections to each of the beads 9 and 11, and includes a switch for energizing either the concentrated filament 3 to give a spot beam, or the long filament 4 to give a flood beam.

*Method of making solder contacts*

The process of making solder bead contacts 9, 11 involves the following steps. As illustrated in Fig. 1a, lead wires 14, 15 are drawn out through perforations in the web 8 which terminate in the generally hemispherical cavities 12, 13. The lead wires are trimmed to a length somewhat longer than desired for the finished product and projecting vertically upward. The trimming and positioning of the lead wires may be accomplished by suitable devices well known in the art. Thereafter small slugs of solder 16, 17, each having a hole 18, 19 therethrough, are threaded over the lead wires and seated on the web, as illustrated in Fig. 1b. The solder slugs 16, 17 are generally rectangular in shape and they are of such size that the volume thereof, when drawn into a generally spherical bead, will fill the wells 12, 13 and leave approximately half of the bead projecting above the surface of the web. The holes 18, 19 through the slugs are preferably as small as possible while yet allowing the lead wires 14, 15 to be threaded therethrough without undue difficulty. It will be appreciated that having the holes 18, 19 small facilitates the drawing of the slug into a bead through surface tension when the solder is heated to its melting point. The bead itself is quite small and within the range of dimensions where the surface tension of the solder, when molten, relative to the weight thereof in the bead, is sufficient to draw the solder to a substantially spherical form.

The next step consists in trimming off the lead wires flush with the surface of the solder slugs, as illustrated at 14', 15' in Fig. 1c. The final step consists in applying heat to the solder slugs, for instance by playing gas flames thereon whereby to melt the solder. The surface tension of the solder thereupon draws it into generally spherical beads 9, 11 which drop down partially into the wells 12, 13. When the beads fuse, their upper halves project above the surface of the web and serve as the end contacts for the base, as illustrated in Fig. 1d.

Basing machine

The present lamp may be based on an automatic lamp finishing machine such as is disclosed for instance in U. S. Patent 1,708,756, Fagan et al., preferably equipped with prefocusing attachments as disclosed in U. S. Patent 2,132,369, Geiger et al. Such a machine comprises a turret or turntable seen in part at 21 in Fig. 2, and suitable driving means (not shown in the drawing) for intermittently rotating the turret in a counterclockwise direction as indicated by the curved arrow 22. The various operations of adjusting the bulb relative to the base, heating the base to set the cement which secures it to the bulb, trimming and positioning the lead wires, and soldering the side lead wire, are performed in known fashion with the aid of mechanisms fixed around the turret at stations into which the bulbs are successively indexed through the intermittent rotary advance of the turret. The present invention is particularly concerned with the operations of forming and feeding the solder slugs, close trimming the lead wires, and melting the solder slugs into the contact beads. These operations are performed by mechanisms respectively located at stations A, B and C of the finishing machine, as indicated in Fig. 2.

The bulb 2 is inserted into the base prior to being placed in the finishing machine; both are then placed in one of the heads 23 shown in plan in Fig. 2 and in side elevation in Fig. 3. Each head comprises a bracket 24 fastened to the edge of the turret 21, and is provided with an apertured arm 25 for supporting the base and a vacuum cup 26 for holding the bulb firmly in place. The bulb and base are loaded together at a loading station where the spring-pivoted arm 27 is lifted up; at other times, arm 27 presses down on the base and seats it firmly by its flange in the aperture within arm 25. The bulb 2 is held down in cup 26 by vacuum suction which is applied thereto from a suitable source through the bore of hollow spindle 28. As more fully described in U. S. Patent 2,132,369, Geiger et al., the present head is designed to allow adjusting the relative positions of the bulb and base in order to accurately prefocus the filament. To this end, bulb cup 26 may be raised or lowered by turning knurled wheel 29, and it may also be shifted laterally by turning knurled head screws 30 and 31. It will be appreciated that whereas the bulb may be adjusted relative to the head, the base itself remains fixed in place and, accordingly, the bases are always presented in the same alignment at stations A to C where the various mechanisms now to be described are located.

Solder slug feeding mechanism

This mechanism receives the solder in the form of round wires 32, 32' fed to it over pulleys 33, 33' (shown in Fig. 2) from spools not shown in the drawing. In the plan view of Fig. 2 the complete solder feeding mechanism consists of right-hand and left-hand units situated side-by-side and inclined at a slight angle to the vertical. The two units are necessary in order to feed solder slugs to the two top wires of the base and they are inclined slightly in order to permit the pick-up pins which deliver the solder slugs to come close together at the delivery points immediately above the lamp base. For greater clarity, only the right-hand unit has been shown in elevation in Fig. 3, and it has been illustrated as if it were in fact vertical. In the description to follow, reference will be made to this unit only; it will be understood, however, that the left-hand unit is in all respects similar to it and the parts thereof will be indicated in Fig. 2 by the same reference numerals followed by a prime mark.

As best seen in Figs. 3 and 4, the mechanism comprises a main slide 34 horizontally reciprocable in a channel within standard 35, and a slide bar 36 vertically reciprocable in a block 37 carried at the forward end of main slide 34. Passing through slide bar 36 is a hollow spindle 38, threaded at its upper end to allow adjustment of the height of the spindle relative to the slide bar by means of nut 39. The lower end of the spindle is machined to a generally rectangular shape at 41 (Fig. 4) and the rear side of this rectangular portion has a downwardly projecting knife-edge forming a cutter 42. Projecting beyond the lower end of spindle 38 is a pick-up pin 43 fastened to a slider 44 enclosed within the bore of the spindle. Slider 44, and of course the pick-up pin fastened to it, is urged downward by spring 45 and is limited in its relative displacement by transverse pin 46 whose ends project through lateral slot 47 in the wall of the spindle. The function of the cutter and pick-up pin, as will be described shortly, is to shear off and pick up the solder slugs and to transport them to the lamp base.

The cutter and pick-up pin are carried back and forth by slide 34 in its horizontal reciprocation. At the rearward limit of the stroke, the cutter and pick-up pin are reciprocated down to cut off the solder slug, and up again to lift it. At the forward limit of the stroke, the cutter and pick-up pin are reciprocated down to deposit the slug on the base, and then up again to clear the base and its holder 23. The back and forth movement of slide 34 is effected from operating rod 48 through bell crank 49 and connecting rod 51 which links the upper end of the bell crank to the slide. Bell crank 49 is pivoted at 52 to standard 35 and normally urges the slide forward by reason of spring 53, operating rod 48 serving to bring the slide back. It will be appreciated that the operating rod moves in synchronism with the finishing machine at each index, and to that end may be linked in usual fashion to the cam shaft of the machine, for instance as described in 1,708,756, Fagan et al.

The vertical reciprocation of slide bar 36 is effected from operating rod 54 through connecting slide rod 55, universal joint 56, linking rod 57, universal joint 58, and lever 59. Operating rod 54 normally engages slide rod 55 through a lateral slot 61 in the former rod which receives pin 62 in the latter rod, these parts being normally held in engagement by push rod 63 urged by compression spring 64. When it is desired to arrest the feeding of solder slugs by the mechanism, operating rod 54 may be pushed to the right by the armature 65 of solenoid 66, whereby to disengage pin 62 from slot 61. Normally, it will be desired to arrest the solder feeding cycle whenever a head 23 not containing a lamp is presented at station A. Whenever this happens, spring-loaded arm 27 on the head is rocked forward and roller 67 supported from the arm fails to engage the armature 68 of the safety switch 69. Switch 69 is connected to energize solenoid 66 and thus the mechanism is prevented from feeding solder slugs into the empty holder.

Lever 59 is pivoted at 71 on standard 35 and engages slide bar 36 through slot 72 in the forward end of the lever and pin 73 which rides in the slot and is fastened to the slide bar. The movement of operating rod 54, which consists of a vertical reciprocation at the rearward and at the forward limits of the horizontal movement of main slide 34, may be achieved in the usual fashion through a linkage to the main cam shaft of the finishing machine.

The solder wire 32, after passing over pulley 33, is threaded through an anti-backslip device 74 on the rear side of standard 35, and then through feed block 75. The feed block contains an air pressure actuated piston 76, the forward face of which is serrated at 77 whereby to grip the solder wire. The feed block is fastened to rod 78 which is reciprocated forward and backward a distance equal to the length of the solder slugs made by the mechanism. The forward movement of the feed block occurs near the end of the rearward stroke of main slide 34 in the following manner. Bolt 79 fastened to main slide 34 rides in a slotted bar 81 pivotally fastened at 82 to the upper arm of crank 83 which pivots at 84 on standard 35 (Fig. 4). The lower arm of the crank carries a pin 85 which engages in a collar 86 on rod 78 to which in turn the feed block is fastened. Screw 87 in slotted bar 81 adjusts the amount of lost motion of bolt 79 within the slot, whereby to control the displacement of feed block and thereby the rate of feed of the solder wire. Spring 88 counters the actions of bolt 79 and slotted bar 81, and causes feed block 75 to return to its rearward position after its forward displacement.

On the forward displacement of the feed block, pressurized air is supplied to it through a flexible tube shown in part at 89, and this causes the serrated face 77 of piston 76 to grip the solder wire. The wire is thus carried forward, that is to the right, as seen in Fig. 3 and the air supply is then cut off to release the wire for the rearward displacement of the feed block. The anti-backslip device 74 prevents the solder wire from slipping back during the rearward stroke of the feed block. It comprises a pivotable finger 91 whose sharpened forward end is pressed against the wire by means of a spring 92. Finger 91 is inclined in the direction of advance of the solder wire, and thus provides little resistance to its forward feed but effectively prevents any backward slipping.

Beyond the feed block, the solder wire passes through an aligned passage in guide block 93 and from there continues over anvil plate 94 (Fig. 4). The round solder wire is flattened at 32a to a moderately thick ribbon by the hammer face 95 of block 96 vertically reciprocable in a channel at 97. The block is driven down once per cycle of the mechanism by an air piston 98 supported above standard 35 on rod 99, and having inlet and outlet fittings 100 and 101 (shown in Fig. 3). The coupling from the air piston to the sliding block 96 is through rod 102 and pin 103.

After flattening, the solder wire enters a passageway through a guide block 104. Here a pin on punch 105 fastened to sliding block 96 and moving through a vertical aperture in guide block 104, pierces a small hole at 106 in the solder ribbon. Beyond the guide block, the solder ribbon emerges over a spring-loaded cut-off die 107 which is normally raised flush with the surface of anvil 94 by spring 108. On the downward stroke of slide bar 36 at the rearward position of main slide 34, pick-up pin 43 is aligned with the hole in the portion of the solder ribbon overlying the cut-off die, as illustrated in Fig. 3. As the slide bar moves down, the pick-up pin enters the hole in the solder ribbon and thereafter cutter 42 shears off a solder slug 32b from the end of the solder ribbon. The shearing operation also causes some crushing of the solder slug with a resulting slight collapse of hole 106 which the pick-up pin has entered. The pick-up pin is also flared outwardly to a slight degree toward its outer end. The combination of the slight crushing of the solder slug with expanding taper of the pick-up pin assures that the slug stays on the pick-up pin when slide bar 36 is raised.

At the forward position of main slide 34, slide bar 36 moves down again and lowers the pick-up pin with the solder slug thereon, into registry with lead wire 14 of a lamp 1 indexed into station A. As previously mentioned, Fig. 4 shows a single solder feeding mechanism with the pick-up pin in vertical alignment with one of the lead-in wires of the lamp; in the actual machine, shown in plan view in Fig. 2, there are two such mechanisms inclined slightly off the vertical to allow the pick-up pins to come into registry with the two lead wires at the lower limit of the stroke of their respective slide bars.

To insure accurate positioning of the lead wires of the lamp at the points where the pick-up pins deliver the solder slugs, there is provided a lead wire positioning device 109 bolted at 111 to bracket 112 which supports standard 35. The lead wires are positioned by the mating of V-notched combining members 113, 114 which are supported on the ends of laterally slidable bars 115, 116. The combing members are normally spaced apart through the action of a wedge 117 at the upper end of a vertically reciprocable rod 118, which is normally entered between rollers 119, 121, fastened to the ends of bars 115, 116. When the lamp is indexed into station A, rod 118 is lowered by means of an appropriate linkage to the cam shaft of the finishing machine, and springs 122, 123 then force the combing members to close together, as illustrated in Fig. 4. The V-shaped notches in the combing members pick up the lead wires and cause them to be guided to the apexes of the notches where they are accurately positioned to receive the solder slugs.

As pick-up pin 43 reaches a point immediately above or in contact with the lead wire 14, it is prevented from descending any lower by stripping plate 125 which engages transverse pin 46 in slider 44. Slide bar 36 continues to move downward a slight amount thereafter so that rectangular portion 41 presses the solder slug off the end of the pick-up pin. The solder slug is thus released and threads itself on the lead wire; thereafter the combing members withdraw and the slug seats itself on the insulating web of the lamp with the lead wire threaded through the hole within it.

It will be appreciated that in the drawing of Fig. 4, positioning device 109, along with the lamp, has been lowered vertically with respect to the remainder of the mechanism, in order to facilitate the illustration of the parts involved. The extent of the vertical displacement of the parts is shown by the gap in the two portions of bracket 112 with dot-dash lines joining them.

*Lead wire trimming*

In order to facilitate the sealing of the solder slugs on the web of the base with lead wires 14, 15 threaded through the holes in them, the lead wires were left considerably longer than is desired in the finished lamp. The condition of the lamp upon being indexed into station B is as illustrated in Fig. 1b. The lead trimming device located at this station cuts off the length of the leads projecting beyond the flat solder slugs which have been deposited upon the web of the base.

Referring to Figs. 2 and 5, the trimming device comprises a pair of sharp-edged cutters 126, 127 fastened on the ends of laterally reciprocable slides 128, 129. The slides are supported in a block 131 and have rack teeth portions at 132, 133 meshing with a common pinion 134 pivotally mounted with respect to the block at 135. Block 131 is supported on a bar 136 slidable vertically through a bracket 137. The lower slide bar 129 which supports cutter 127 is actuated directly by an air piston 138 coupled to it by a link 139. By reason of the linkage through pinion 134, when lower slide bar 129 moves to the right, upper slide bar 128 is simultaneously constrained to move to the left so that cutters 126, 127 close together in unison.

During the index of the finishing machine turret, support bar 136 is raised to its upper position so that cutters 126, 127 are lifted above the path of the lamps and are also opened out. During the dwell interval of the lamp at station B, support bar 136 is lowered and a preliminary closing together of cutters 126, 127 is effected through bell crank 141 pivoting at 142 on block 131, and whereof the longer leg engages a roller 143 on bracket 137. This causes the bell crank to rock about its pivot point and its shorter leg to engage roller 144 on slide 129, thereby effecting a partial closing of the cutters. The cutters are closed enough so that their lower edges will come to bear upon the solder slug, but not enough to engage the lead wire 14. The downward movement of the cutter device is thus determined at the point where it is desired to shear off the lead wires. Thereafter, compressed air is admitted to the air piston 138 and the cutters 126, 127 are forced together and the lead wires are sheared off flush with the upper surface of the solder slugs.

*Solder bead forming*

After the lead wire trimming operation, the lamp is substantially as illustrated in Fig. 1c. At station C gas jets 145, 146 supplied through the tubing at 147, direct flames upon the solder slugs. The heat melts the solder and, by reason of the small size of the slug, its surface tension is sufficient to draw the solder into a bead which drops down in part into the wells 12, 13 with part of the bead projecting over the surface of the web. Upon cooling of the solder beads, the finished lamp is as illustrated in Fig. 1d.

While a specific version of the method of the invention has been described in detail by reference to one specific lamp, it will be understood that variations in the details of the method will readily occur to those skilled in the art and desirous of applying the method to a different article or lamp. Furthermore, the specific apparatus which has been described for carrying out the method automatically in conjunction with a lamp finishing machine, may likewise be varied in its details and arrangement of parts both as regards the solder slug feeding mechanism which has been described and the other apparatus auxiliary thereto. The appended claims are therefore intended to cover any such modifications coming within the true spirit and scope of the invention.

What we claim as new and desire to secure by Letters Patent of the United States is:

1. Solder bead contact making apparatus comprising means for indexing past a series of work stations an electric lamp having a base seated thereon with a lead wire projecting through an insulating web on said base, means located at one of said stations for feeding a small perforated slug of solder onto said base with said lead wire threaded through the perforation in the slug, means located at another station for trimming off the lead wire substantially flush with the surface of the slug, and heating means located at yet another station for melting said slug whereby to draw it into a bead attached to the end of said lead wire.

2. Solder bead contact making apparatus comprising means for indexing past a series of work stations an electric lamp having a base seated thereon with a lead wire projecting through an insulating web on said base, a solder slug feeding mechanism located at one of said stations and comprising means for perforating solder ribbon and a reciprocable cutter and pick-up pin device for cutting off a perforated slug of solder and feeding it onto said web and with the perforation in registry with the lead in order to thread the lead through the perforation, means located at another station for trimming off the lead wire substantially flush with the surface of the slug, and heating means located at yet another station for melting said slug whereby to cause it to draw into a bead attached to the end of said lead wire.

3. A solder slug feeding mechanism comprising feeding means for advancing a solder ribbon by discrete even steps, a reciprocating punch synchronized to the feeding means for perforating said ribbon at spaced intervals, a solder slug shearing and transporting device comprising a vertically reciprocable cutter and a pick-up pin, means for lowering said pin into the perforation in said solder ribbon and said cutter against said solder ribbon whereby to shear off a slug of solder and to retain said slug hanging on said pick-up pin, means for transporting said pick-up pin into registry with a lead wire of an electric lamp, and means for stripping said solder slug off said pick-up over said lead wire.

4. A solder slug feeding mechanism comprising feeding means for advancing a solder ribbon by discrete even steps, a reciprocating punch synchronized to the feeding means for perforating said ribbon at spaced intervals, a solder slug shearing and transporting device comprising a vertically reciprocable cutter and a pick-up pin, a horizontally slidable member supporting said device, means for reciprocating said device at a rearward position of said slide member in order to lower said pin into the perforation in said solder ribbon and said cutter against said solder ribbon whereby to shear off a slug of solder and to retain said slug hanging on said pin, means for advancing said slide member to a forward position, means for lowering said pin at said advanced position into registry with a lead wire of an electric lamp, and means for stripping said solder slug off said pin over said lead wire.

5. A solder slug feeding mechanism comprising feeding means for advancing solder wire by discrete even steps, a reciprocating member synchronized to the solder ribbon feeding means and including a hammer portion for flattening said wire to ribbon and a punch for perforating said ribbon at spaced intervals, a solder slug shearing and transporting device comprising a vertically reciprocable head having a knife edge and a depending pick-up pin, a horizontally slidable member supporting said device, means for reciprocating said device at a rearward position of said slide member in order to lower said pin into the perforation in said solder ribbon and said knife edge against said solder ribbon whereby to shear off a slug of solder and to retain said slug hanging on said pin, means for advancing said slide member to a forward position, means for lowering said device at said advanced position with said pin in registry with a lead wire of an electric lamp, and a stripping plate engaging a portion of said pin at the limit of downward movement of said device whereby to lift said pin into said head and strip off said solder slug over said lead wire.

References Cited in the file of this patent

UNITED STATES PATENTS

| | | |
|---|---|---|
| 1,706,880 | Gustin | Mar. 26, 1929 |
| 1,708,756 | Fagan et al. | Apr. 9, 1929 |
| 1,760,507 | Loebe et al. | May 27, 1930 |
| 2,020,752 | Wiley et al. | Nov. 12, 1935 |